(12) United States Patent
Zhou et al.

(10) Patent No.: US 8,919,379 B2
(45) Date of Patent: Dec. 30, 2014

(54) PLUG SWITCH OUTLET MECHANISM

(75) Inventors: Huasong Zhou, Xiamen (CN); Haisong Peng, Xiamen (CN); Renzhong Li, Xiamen (CN); Bin Chen, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 161 days.

(21) Appl. No.: 13/583,178

(22) PCT Filed: Mar. 8, 2011

(86) PCT No.: PCT/CN2011/071599
§ 371 (c)(1),
(2), (4) Date: Sep. 6, 2012

(87) PCT Pub. No.: WO2011/110081
PCT Pub. Date: Sep. 15, 2011

(65) Prior Publication Data
US 2012/0325353 A1    Dec. 27, 2012

(30) Foreign Application Priority Data

Mar. 9, 2010  (CN) .......................... 2010 1 0120616
Mar. 9, 2010  (CN) ....................... 2010 2 0126525 U

(51) Int. Cl.
| | |
|---|---|
| F16K 11/07 | (2006.01) |
| B05B 1/16 | (2006.01) |
| E03C 1/04 | (2006.01) |
| E03C 1/06 | (2006.01) |
| F16K 11/056 | (2006.01) |
| F16K 11/065 | (2006.01) |
| B05B 1/18 | (2006.01) |

(52) U.S. Cl.
CPC ............. *B05B 1/1618* (2013.01); *E03C 1/0408* (2013.01); *E03C 1/06* (2013.01); *F16K 11/056* (2013.01); *F16K 11/065* (2013.01); *B05B 1/18* (2013.01)

USPC ...... 137/625.48; 137/872; 137/882; 251/279; 239/447

(58) Field of Classification Search
USPC ............ 137/625.48, 864, 862, 872, 881, 882; 239/444, 445, 446, 447; 251/287, 280, 251/347, 348, 279; 4/601, 605
See application file for complete search history.

(56) References Cited

U.S. PATENT DOCUMENTS

| | | | | |
|---|---|---|---|---|
| 3,441,054 | A | * | 4/1969 | Mellan .......................... 137/872 |
| 4,203,551 | A | * | 5/1980 | Levine .......................... 239/381 |
| 5,560,548 | A | * | 10/1996 | Mueller et al. ................ 239/442 |

(Continued)

FOREIGN PATENT DOCUMENTS

| | | |
|---|---|---|
| CN | 2564258 Y | 8/2003 |
| CN | 200957383 Y | 10/2007 |

(Continued)

*Primary Examiner* — John Rivell
*Assistant Examiner* — R. K. Arundale
(74) *Attorney, Agent, or Firm* — Rabin & Berdo, P.C.

(57) ABSTRACT

A plug switch outlet mechanism has a first and second shower. The first shower includes a first switch mechanism inside and a socket outside a fixed unit, an outlet connected to the fixed unit; the fixed unit is disposed with two waterways and an inlet waterway connected to the external water source, one of the waterway is connected to the outlet, the socket is disposed with a switch, the switch is driving connected to the first switch mechanism for driving the first switch mechanism when touched to make the two waterways switched to connect to the inlet waterway; the second shower is connected to the other waterway, the second shower is coupled to the socket and can plug into the socket, when the second shower is inserted into the sockets or pulled away from the socket, the switch is touched.

18 Claims, 10 Drawing Sheets

(56) References Cited

U.S. PATENT DOCUMENTS

| | | |
|---|---|---|
| 7,213,616 B2 * | 5/2007 | Wuollet et al. .......... 137/625.48 |
| 7,299,510 B2 * | 11/2007 | Tsai ................................. 4/601 |
| 7,373,954 B2 * | 5/2008 | Zhadanov et al. ....... 137/625.47 |
| 8,191,185 B2 * | 6/2012 | Tsai ................................. 4/601 |
| 2005/0061896 A1 * | 3/2005 | Luettgen et al. .............. 239/449 |
| 2005/0098661 A1 | 5/2005 | Lev |
| 2007/0022528 A1 | 2/2007 | Gilbert |
| 2007/0158460 A1 | 7/2007 | Lev |
| 2009/0276953 A1 * | 11/2009 | Hsu et al. .......................... 4/601 |

FOREIGN PATENT DOCUMENTS

| | | |
|---|---|---|
| CN | 101218035 A | 7/2008 |
| CN | 201088942 Y | 7/2008 |
| CN | 201098654 Y | 8/2008 |
| CN | 101862713 A | 10/2010 |
| CN | 201603636 U | 10/2010 |
| DE | 3115464 A1 | 4/1982 |
| FR | 2792701 A1 | 10/2000 |
| JP | 2001-137143 A | 5/2001 |

* cited by examiner

PLUG SWITCH OUTLET MECHANISM

FIELD OF THE INVENTION

The present invention relates to an outlet mechanism, especially to a plug switch outlet mechanism.

BACKGROUND OF THE INVENTION

Showers are widely used in the people's daily life, while the technology of outlet unit combined with head shower and hand shower is provided as well. It's provided with an outlet unit combined with a fixed shower and a hand shower disclosed in American patent database with application number of US20050098661, disclosed in Chinese patent database with application number of CN200580036723, announced in Chinese patent database with application number of CN200620065207.8, disclosed in American patent database with application number of US20070022528. The outlet of the fixed shower is disposed with a plug groove for hand shower. It has a regulating switch button disposed in the inlet end and at the back side of the fixed unit of the shower for the switch of the outlet function of the fixed shower and the hand shower. In American patent database with application number of US200602422759, it is disclosed with a supporting device for outlet unit, the first shower is connected to the first outlet and fixed to the wall, the first shower is disposed with a plug groove for the second shower, and the second shower is connected to the second outlet through flexible tube. In American patent database with application number of US20070158460, it is disclosed with a water diversion device for a shower, which includes a fixed shower and a hand shower, the water diversion regulating button is disposed in the handle of the hand shower connected to the flexible tube.

The above technical proposals are provided with an outlet unit combined with a fixed shower and a hand shower, which have disadvantages as below: firstly, when the outlet unit is used, people have to insert the hand shower to the socket and switch the water diversion button with unpleasant method and inconvenient usage; secondly, the socket of the head shower affects the selection of the switch mechanism of the outlet functions of the head shower, with little selection of the switch mechanism. For example, the rotation switch mechanism can not be selected.

SUMMARY OF THE INVENTION

The present invention is provided with a plug switch outlet mechanism, which overcomes the problems of the existing technology.

The technical proposal of the present invention is as below:

A plug switch outlet mechanism includes:

A first shower, compositing a fixed unit, a first switch mechanism inside the fixed unit, an outlet connected to the fixed unit and a socket outside the fixed unit; the fixed unit is disposed with two waterways and an inlet waterway connected to the external water source, one of the waterways is connected to the outlet, the socket is disposed with a switch, the switch is driving and connected to the first switch mechanism for driving the first switch mechanism when touched to make the two waterways switched to connect to the inlet waterway; and A second shower, connected to the other waterway, the second shower is coupled to the socket and can be plugged into the socket, when the second shower is inserted into the socket or pulled away from the socket, the switch is touched.

In another preferred embodiment, the socket is fixed to the middle of the fixed unit.

In another preferred embodiment, the outlet is rotated and connected to the fixed unit, the outlet is disposed with several outlet functions, each outlet function is disposed with a water diversion hole corresponding to the waterway, the switch of the outlet function of the first shower is realized by rotating the outlet.

In another preferred embodiment, the fixed unit further includes a sliding hole and a control cavity connected between the inlet waterway and the waterways, the inner end of the sliding hole is connected to the control cavity;

The first switch mechanism is disposed with a push plate and a sealing, the push plate is sliding and connected to the sliding hole, the sealing is disposed in the inner end of the push plate, the switch is pivot jointed to the socket, the switch withstands the outer end of the push plate; the switch withstands the push plate and drives the push plate slide between a first position and a second position, the other waterway is sealed by the sealing and the inlet waterway is connected to the waterway when the push plate is situated in the first position, the waterway is sealed by the sealing and the inlet waterway is connected to the other waterway when the push plate is situated in the second position.

In another preferred embodiment, the socket is disposed with a plug surface according to the second shower, the plug surface is concaved to form an accommodating groove, which is connected to the outer opening of the sliding hole, one end of the switch is pivot jointed to the accommodating groove, the other end of the switch withstands the outer end of the push plate.

In another preferred embodiment, an elastic piece is disposed between the push plate and the fixed unit, the elastic piece produces elastic force, and the direction of the elastic force is from the first position to the second position, the elastic force works on the push plate.

In another preferred embodiment, the first shower is a head shower, the second shower is a hand shower, the hand shower is connected to the other waterway of the head shower through a flexible tube.

In another preferred embodiment, the fixed unit includes a ball unit, a body, a main body, an upper water diversion body, a joint and a press plate:

The body is opened with a first throughout hole of inner and outer in the middle of the body and a second throughout hole of inner and outer;

The main body is disposed with an inlet waterway formed from the top surface concaved downwards, a sliding groove formed from the side surface concaved inwards, a first watercourse, a second watercourse, a water groove formed from the side surface of the main body concaved inwards, a connection waterway connected to the second watercourse and the water groove;

The upper water diversion body is opened with a water channel of throughout, the joint is passed through the second throughout hole, one end of the joint is connected to the water groove, while the other end is extended out of the body to connect to the hand shower through flexible tube;

The press plate is fixed to the end of the sliding groove.

In another preferred embodiment, the top surface of the upper water and the bottom surface of the main body are welded together; the water channel is connected to the first watercourse to form the first waterway.

In another preferred embodiment, the entries of the first watercourse and the second watercourse are disposed on the inner surface of the sliding groove.

Compared to the existing technology, the present invention has advantages as below: firstly, when the second shower is inserted into the socket or pulled away from the socket, the switch of the two waterways to connect to the inlet waterway is realized by the first switch mechanism touched by the switch, the selection is simple, fast and convenient; secondly, the socket is fixed to the middle of the fixed unit, the outlet is of variety, making it convenient for the standardization of the components, the outlet follows the widely usage pattern; thirdly, the switch of the outlet function of the head shower is realized by the rotation between the outlet and the fixed unit, which is convenient for the user; fourthly, the switch of the two waterways is realized through the switch, the push plate and the sealing with simple mechanism; fifthly, an elastic piece is disposed between the push plate and the fixed unit, making sure that the switch is touched when the second shower is pulled away from the socket or inserted into the socket; sixthly, one end of the switch is pivot jointed to the accommodating groove while the other end withstands the outer end of the push plate, making sure that the switch is touched when the second shower is pulled away from the socket or inserted into the socket.

BRIEF DESCRIPTION OF THE DRAWINGS

The present invention is further described with the drawings and the embodiments.

DETAILED DESCRIPTION OF THE EMBODIMENT

Figure 1:
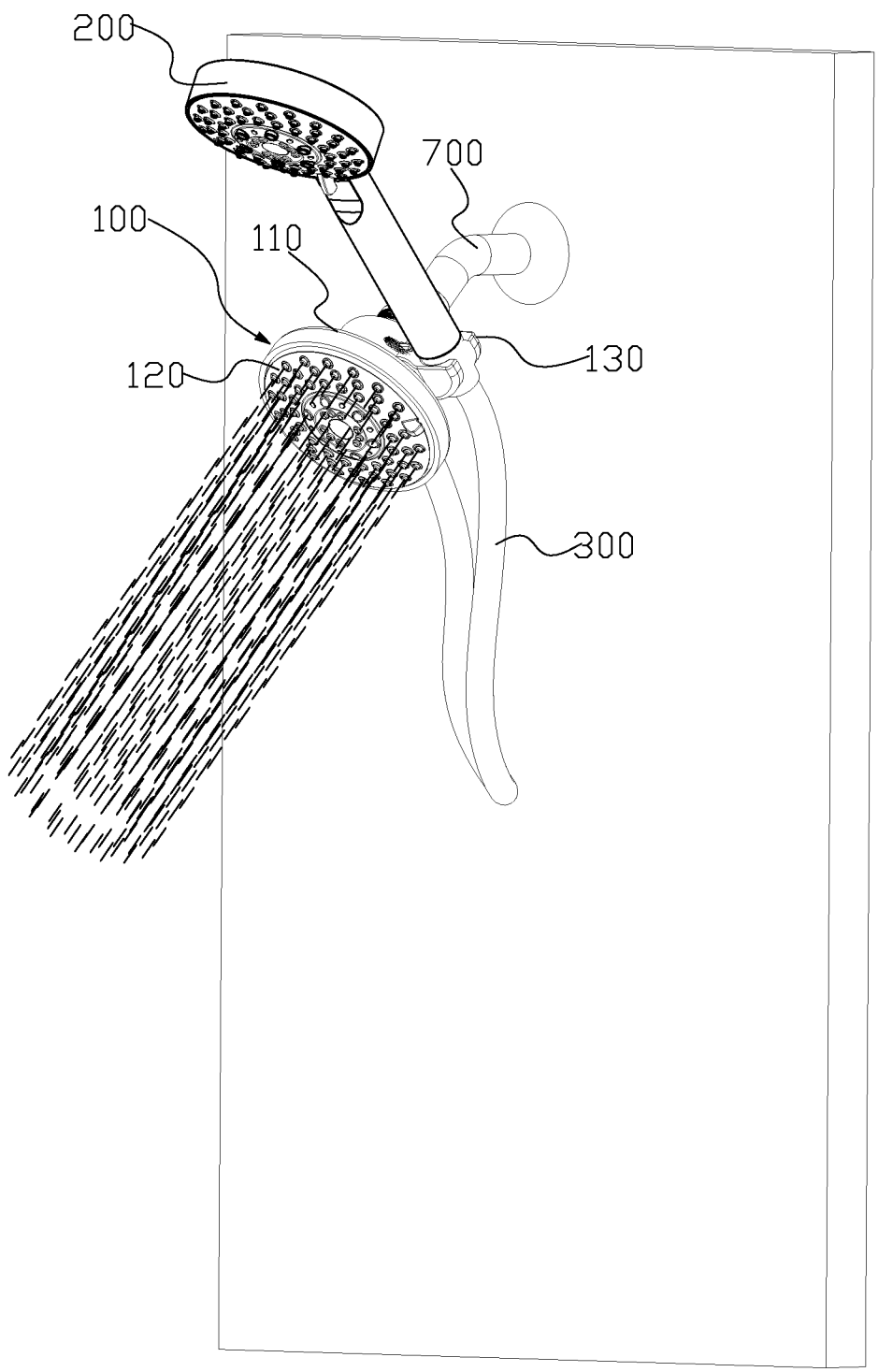
FIG. 1 illustrates the structure of the plug switch outlet mechanism of the preferred embodiment of the present invention when water is flowing through the head shower.
Figure 15:
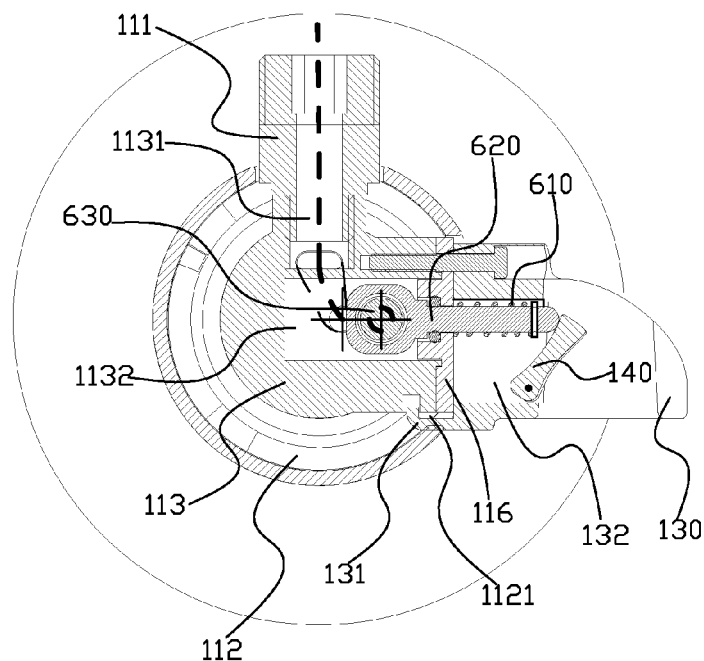
FIG. 15 illustrates the sectional view of the B-B of the FIG. 14.

Please refer to the FIG. 1 to the FIG. 15 with the plug switch outlet mechanism of the preferred embodiment of the present invention.

Figure 2:
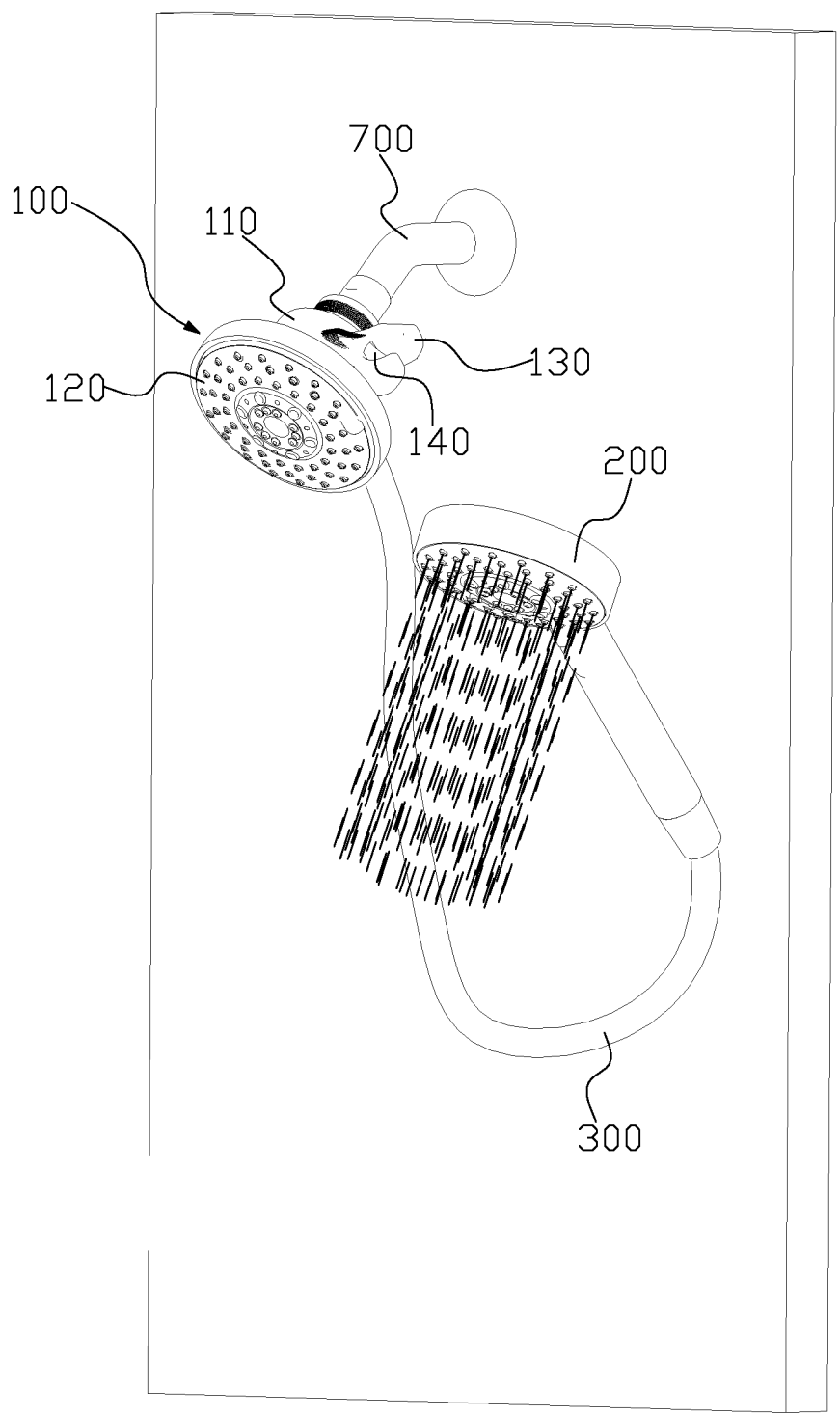
FIG. 2 illustrates the structure of the plug switch outlet mechanism of the preferred embodiment of the present invention when the water is flowing through the hand shower.

As figured in the FIG. 1 and FIG. 2, the plug switch outlet mechanism includes a head shower 100 and a hand shower 200.

Figure 3:
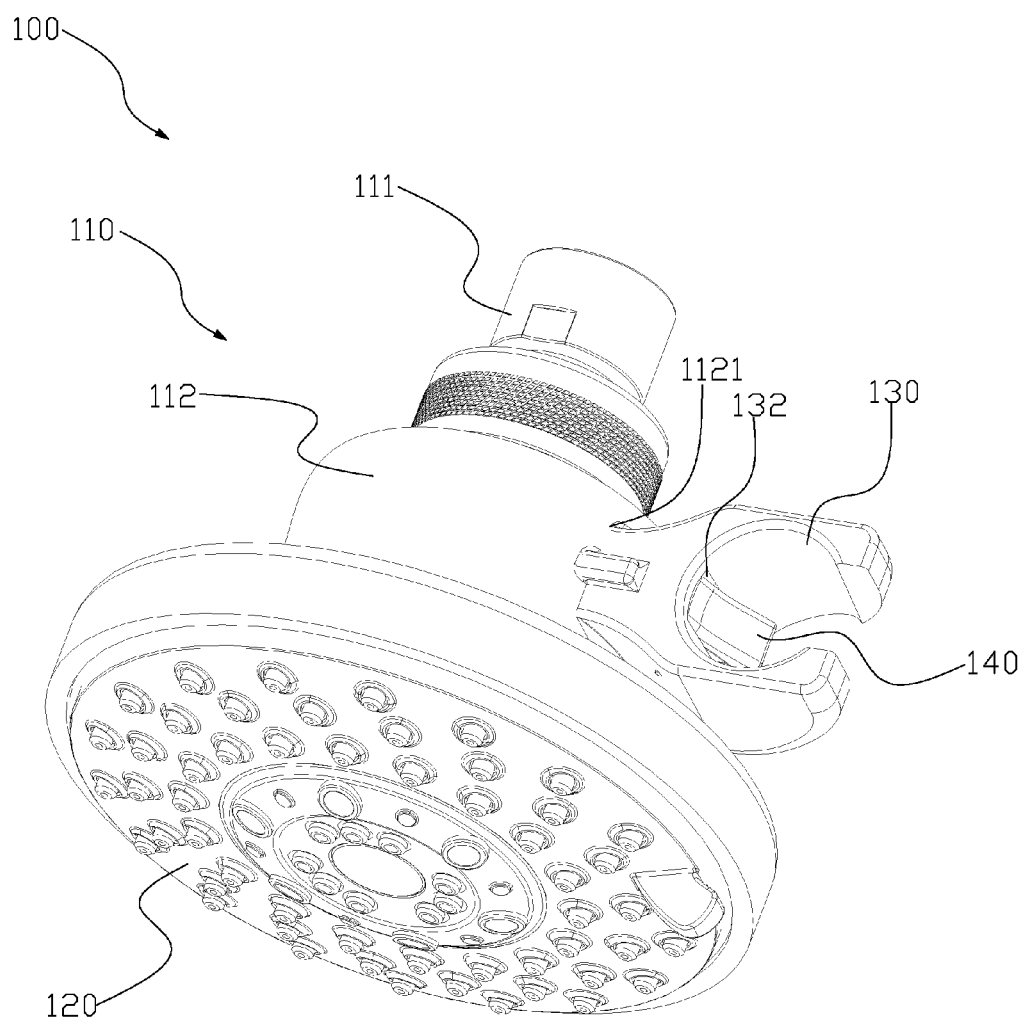
FIG. 3 illustrates the structure of the head shower of the plug switch outlet mechanism of the preferred embodiment of the present invention.
Figure 4:
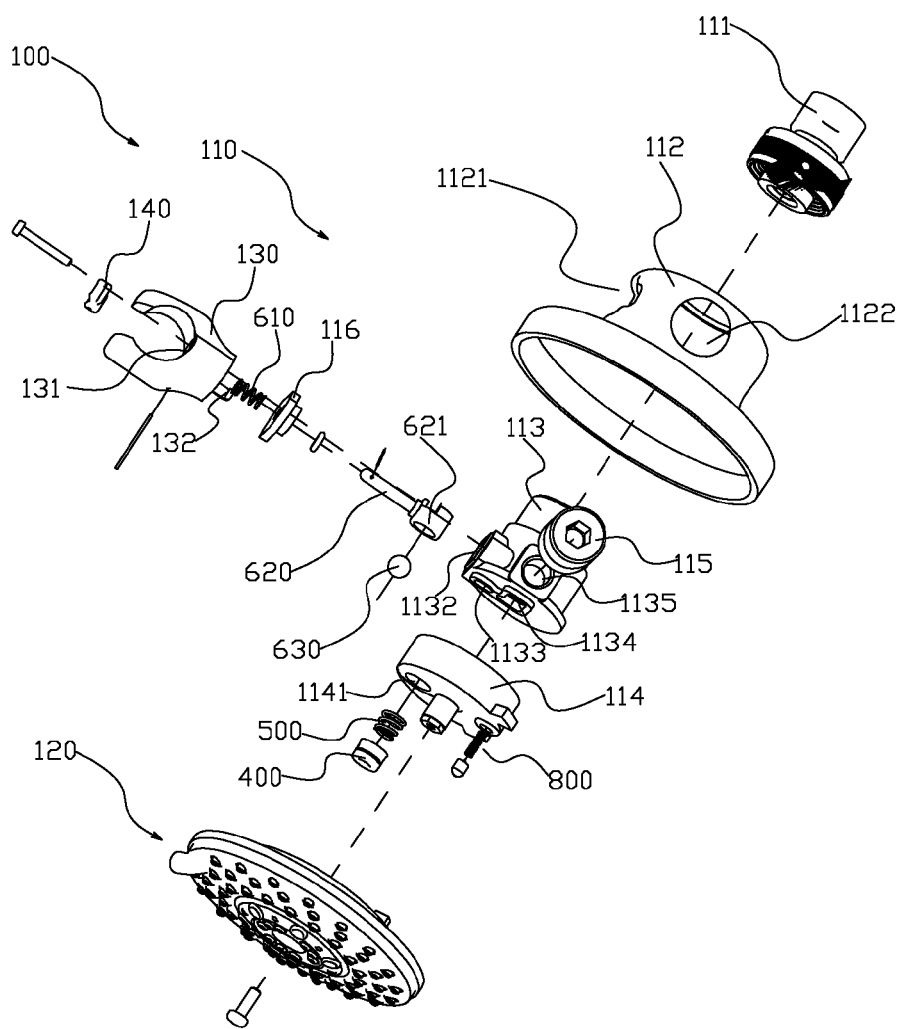
FIG. 4 illustrates the breakdown structure of the head shower of the plug switch outlet mechanism of the preferred embodiment of the present invention.
Figure 5:
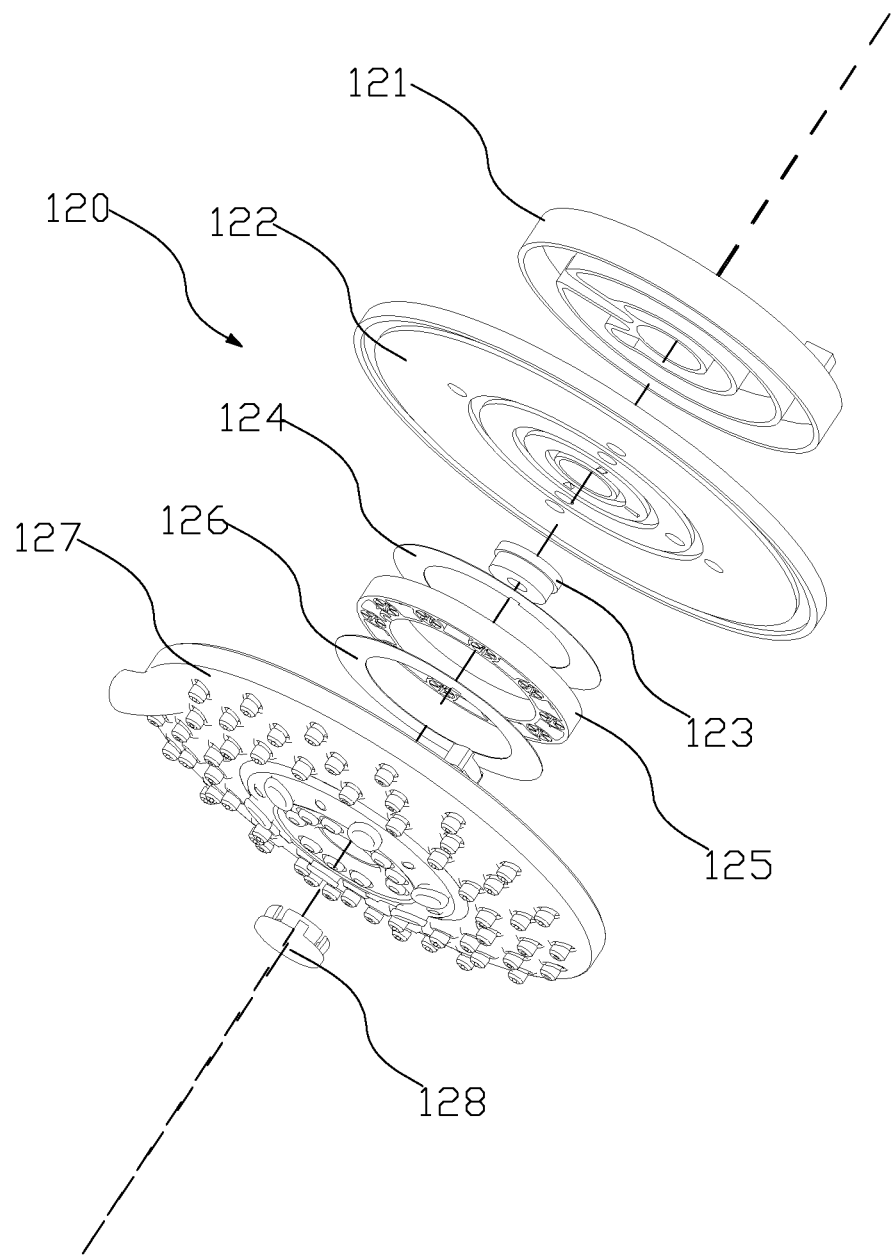
FIG. 5 illustrates the breakdown structure of the outlet of the head shower of the head shower of the plug switch outlet mechanism of the preferred embodiment of the present invention.
Figure 6:
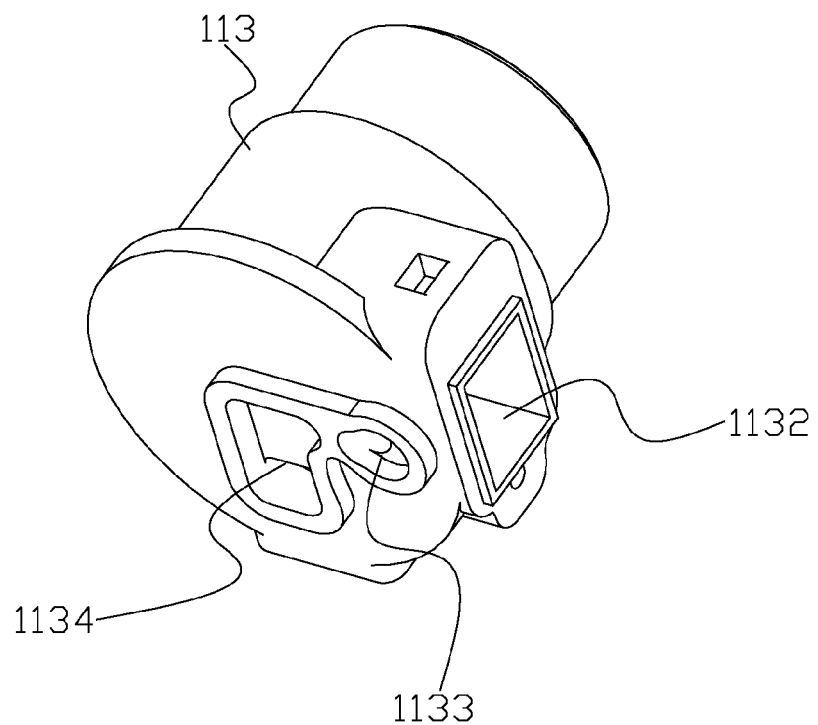
FIG. 6 illustrates the structure of the main body of the head shower of the head shower of the plug switch outlet mechanism of the preferred embodiment of the present invention.
Figure 7:
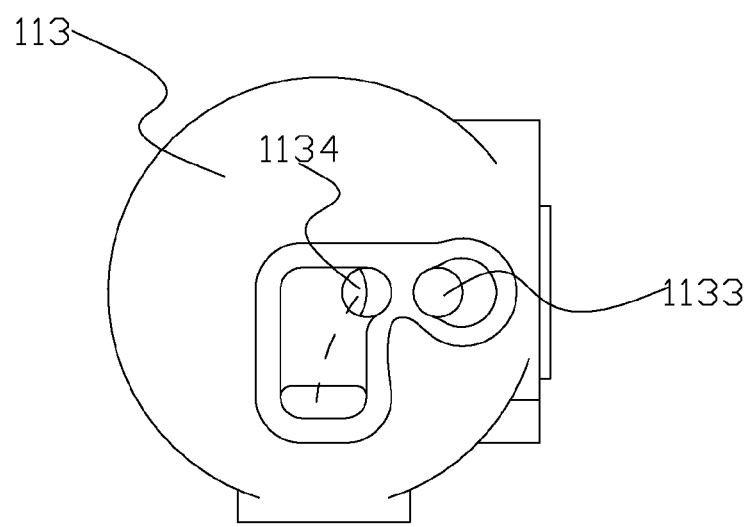
FIG. 7 illustrates the bottom view of the main body of the head shower of the head shower of the plug switch outlet mechanism of the preferred embodiment of the present invention.
Figure 8:
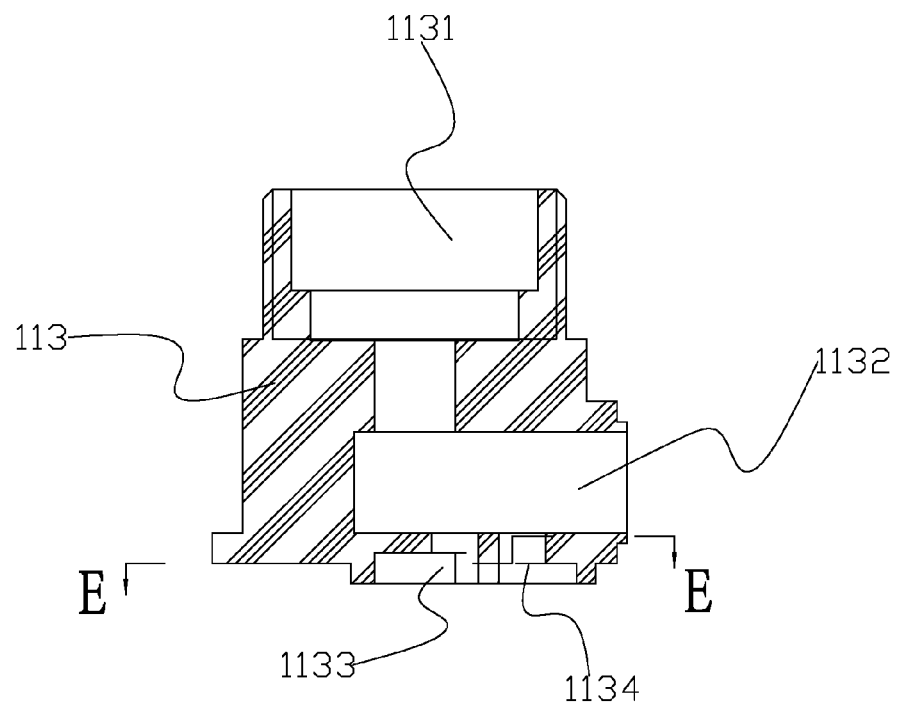
FIG. 8 illustrates the sectional view of the main body of the head shower of the head shower of the plug switch outlet mechanism of the preferred embodiment of the present invention.
Figure 9:
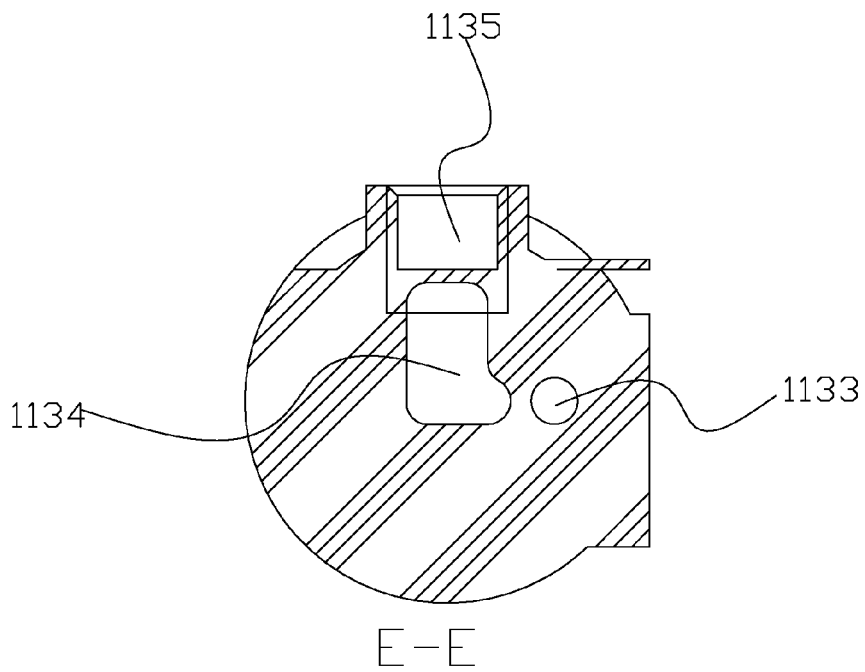
FIG. 9 illustrates the sectional view of E-E of the FIG. 8.
Figure 10:
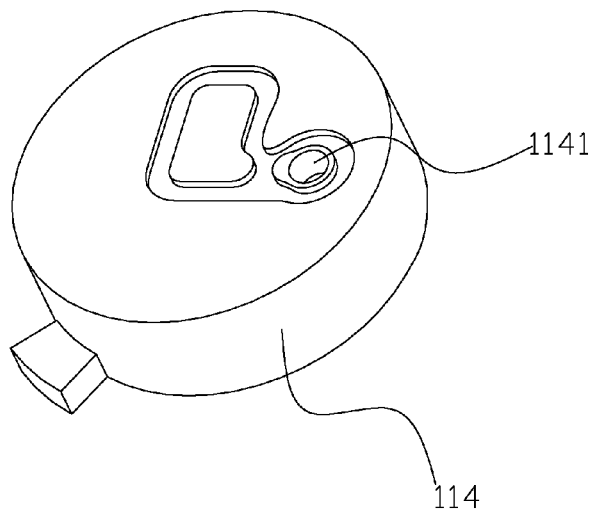
FIG. 10 illustrates the structure of the upper water diversion body of the head shower of the plug switch outlet mechanism of the preferred embodiment of the present invention.
Figure 11:
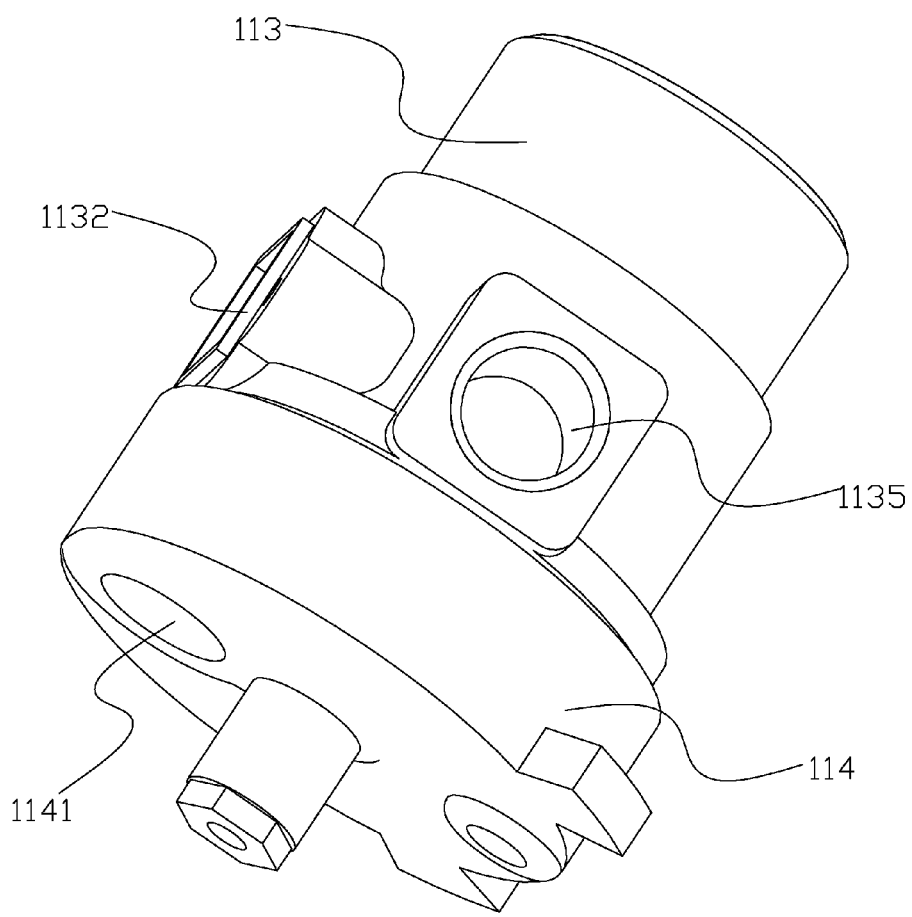
FIG. 11 illustrates the structure of the assembly of the upper water diversion body and the main body of the head shower of the plug switch outlet mechanism of the preferred embodiment of the present invention.

As figured in the FIG. 3 to the FIG. 11, the head shower 100 includes a fixed unit 110, a first switch mechanism, an outlet 120, a socket 130 and a switch 140.

The fixed unit 110 includes a ball unit 111, a body 112, a main body 113, an upper water diversion body 114, a joint 115 and a press plate 116.

The body 112 is convex shaped; the upper of the body 112 is fixed to a supporting arm 700 through the ball unit 111. The ball unit 111 is fixed to the supporting arm 700 while the body 112 is fixed to the ball unit 111. The body 112 is opened with a first throughout hole 1121 of throughout inner and outer in the middle of the body 112 and a second throughout hole 1122 of throughout inner and outer.

The main body 113 is disposed with an inlet waterway 1131 formed from the top surface of the main body 113 concaved downwards, a sliding groove 1132 formed from the side surface of the main body 113 concaved inwards, a first watercourse 1133, a second watercourse 1134, a water groove 1135 formed from the side surface of the main body 113 concaved inwards, a connection waterway connected the second watercourse 1134 and the water groove 1135, the entries of the first watercourse 1133 and the second watercourse 1134 are disposed on the inner surface of the sliding groove 1132.

The upper water diversion body 114 is opened with a water channel 1141 of throughout; the top surface of the upper water diversion body 114 and the bottom surface of the main body 113 are welded together. The water channel 1141 is connected to the first watercourse 1133 to form the first waterway.

The joint 115 is passed through the second throughout hole 1122, one end of the joint 115 is connected to the water groove 1135, while the other end is extended out of the body 112 to connect to the hand shower 200 through flexible tube 300. The second watercourse 1134, the connection channel, the water groove 1135 and the joint 115 are formed the second waterway.

The press plate 116 is fixed to the end of the sliding groove 1132. The press plate 116 is disposed with a throughout hole according to the sliding groove 1132, the sliding groove 1132 and the throughout hole are formed the sliding hole, which is corresponding to the first throughout hole 1121. The outlet 120 is rotated and connected inside the body 112. the outlet 120 has several outlet functions, each outlet functions is disposed with a water diversion hole corresponding to the lower end of the water channel 1141 of the first waterway, so one of the water diversion hole is connected to the water channel 1141 when the outlet 120 is rotated to realize the switch of the outlet function of the head shower. In this embodiment, the outlet function is bubble water, massage water or shower water and so on. It includes a lower water diversion body 121, an inclined water body 122, a spacer 123, a filter 124, a bubble device 125, a rotor 126, a cover 127 and a catch cover 128. The cover 127 is disposed with a convex button for the selection of the different outlet functions of the head shower for the user. To enhance the rotation switch function, it is better to disposed a packing leather 400 in the lower end of the water channel 141 of the first waterway and a spring 500 withstanding between the packing leather 400 and the water channel to make the packing leather 400 sealed and contacted to the outlet, making sure axial sealing and radial sealing. To enhance rotation handle of the user and make sure the maintaining of the switch of the outlet function, it is better to further dispose a position mechanism 800. the position mechanism 800 includes a groove disposed below the upper water diversion body, a withstand spring inside the groove, a pin connected to the withstand spring and several position holes disposed on the outlet 120, the position holes are corresponding to the water diversion holes one by one, the pin is corresponding to the position hole and works on the position hole to realize position.

The socket 130 is passed through the first throughout hole 1121 and locked to the main body 113 through a catch arm 131, making the socket 130 and the fixed unit 110 form a fixed connection relationship. The plug surface of the socket 130 is concaved downward to form an accommodating groove 132, which is corresponding to the sliding hole.

Figures 12, 13:
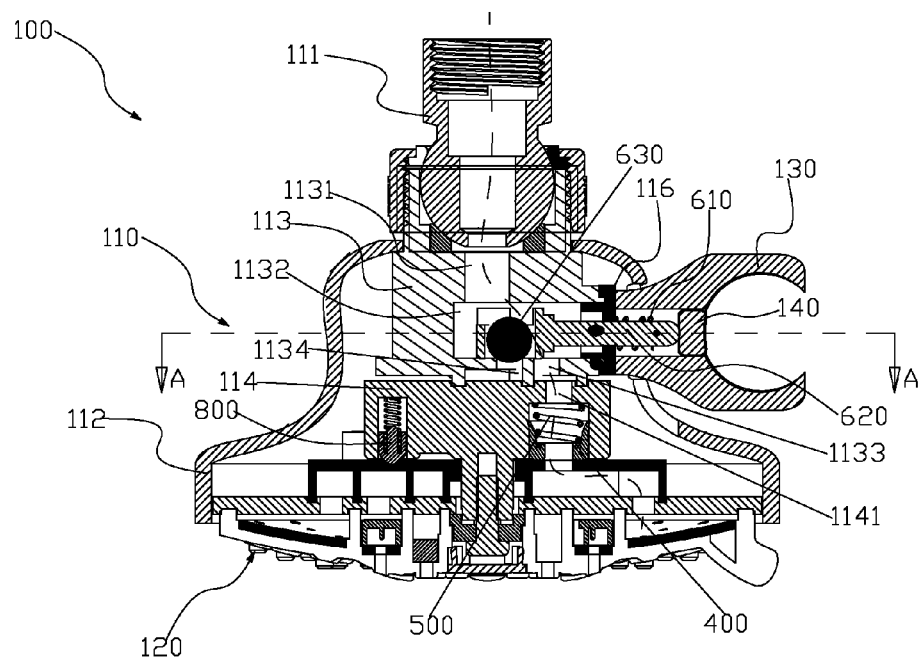
FIG. 12 illustrates the sectional view of the head shower of the plug switch outlet mechanism of the preferred embodiment of the present invention when the water is flowing through the head shower.
FIG. 13 illustrates the sectional view of the A-A of the FIG. 12.

Please refer to the FIG. 12 to the FIG. 15, one end of the switch 140 is pivot jointed to the accommodating groove 132 and rotating between the third position and the fourth position, the fourth position is referred to the other end of the switch 140 extended out of the accommodating groove 132, the third position is referred to the other end of the switch 140 drawn back to the accommodating groove 132. When the hand shower 200 is inserted to the socket 130, the hand shower 200 works on the other end of the switch 140 to make the switch 140 rotate from the fourth position to the third position. When the hand shower 200 is pulled away from the socket 130, the switch 140 rotates from the third position to the fourth position with the effect of the elastic piece 610. The direction from one end to the other end is the same as the plug direction of the hand shower. The first switch mechanism includes an elastic piece 610, a push plate 620 and a sealing 630. the push plate 620 is connected to the sliding hole and sliding between the first position and the second position. The elastic piece 610 is disposed between the push plate 620 and the fixed unit, the elastic piece 610 produces elastic force, the direction of the elastic force is from the first position to the second position, the elastic force works on the push plate 620. The outer end of the push plate 620 withstands the switch 140, the inner end is disposed with a connection base 621, the sealing 630 is a closure ball disposed inside the connection base 621. When the switch 140 is situated in the third position, the push plate 620 is situated in the first position; when the switch 140 is situated in the fourth position, the push plate 620 is situated in the second position. When the push plate 620 is situated in the first position, the sealing 630 closes the entry of the second watercourse 1134 of the second waterway, the inlet waterway 1131 is connected to the first waterway, the water flows out of the head shower 100; when the push plate 620 is situated in the second position, the first waterway is sealed by the sealing 630, the inlet waterway 1131 is connected to the second waterway, the water flows out of the hand shower 200.

The hand shower 200 is connected to the joint 115 of the second waterway through the flexible tube 300. The hand shower 200 is coupled to the socket 130 and can insert into the socket 130.

When the hand shower 200 is inserted into the socket 130, the hand shower 200 works on the switch 140, making it rotated from the fourth position to the third position, meanwhile the push plate 620 moves from the second position to the first position, the elastic piece 310 is pressed to store energy, the entry of the second watercourse 1134 of the second waterway is sealed by the sealing 630. The inlet waterway 1131 is connected to the first waterway, the water flows out of the head shower 100. The outlet function of the head shower 100 is switched by rotating the outlet 130. Please refer to the FIG. 1, FIG. 12 and FIG. 13.

Figure 14:
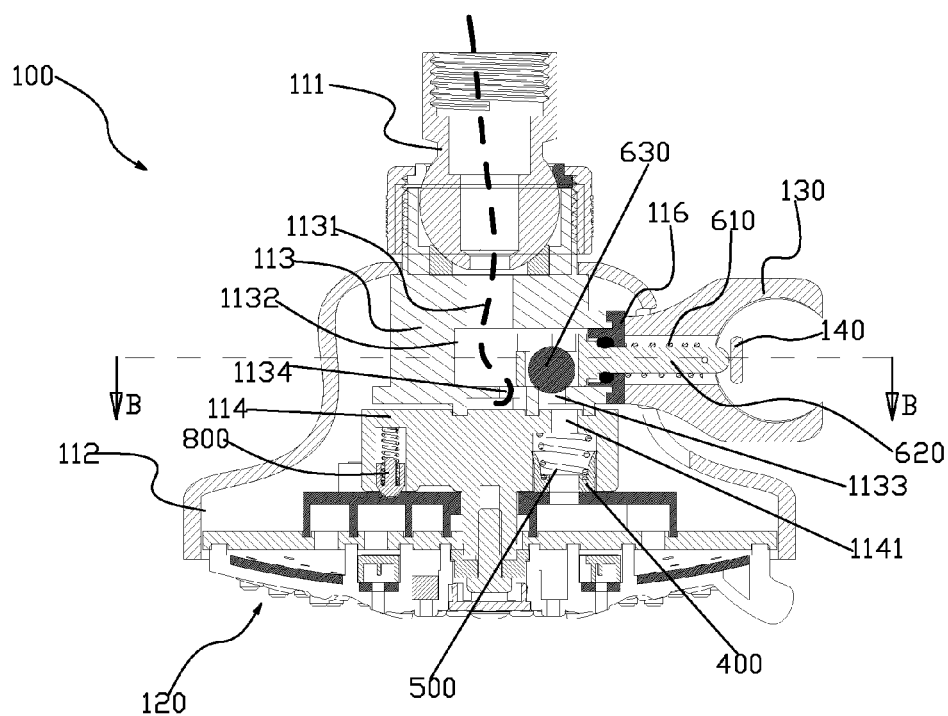
FIG. 14 illustrates the sectional view of the head shower of the plug switch outlet mechanism of the preferred embodiment of the present invention when the water is flowing through the hand shower.

When the hand shower 200 is pulled away from the socket 130, the switch 140 is rotated from the third position to the fourth position with the effect of the elastic force of the elastic piece 610, meanwhile the push plate 620 moves from the first position to the second position, the entry of the first watercourse 1133 of the first waterway is sealed by the sealing 630, the inlet waterway 1131 is connected to the second waterway, the water flows out of the hand shower 200. Please refer to the FIG. 2, FIG. 14 and FIG. 15.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a plug switch outlet mechanism, when the second shower is inserted into the socket or pulled away from the socket, the switch of the two waterways to connect to the inlet waterway is realized by the first switch mechanism touched by the switch, the selection is simple, fast and convenient.

What is claimed is:
1. A plug switch outlet mechanism, comprising:
a first shower, including a fixed unit, a first switch mechanism inside the fixed unit, an outlet connected to the fixed unit and a socket outside the fixed unit;
wherein the fixed unit is provided with first and second waterways and an inlet waterway connected to an external water source, the first shower is connected to the first waterway, the socket is provided with a switch, and the switch impinges on the first switch mechanism for driving to drive the first switch mechanism when the switch is touched, to switch between connecting the first or the second waterway to the inlet waterway; and
a second shower, connected to the second waterway, wherein the second shower is configured to be coupled to the socket and to be plugged into the socket, and the switch is touched when the second shower is either inserted into the socket or pulled away from the socket.

2. A plug switch outlet mechanism according to claim 1, wherein the socket is fixed to the middle of the fixed unit.

3. A plug switch outlet mechanism according to claim 2, wherein the outlet is rotated and connected to the fixed unit, the outlet is provided with several outlet functions, each outlet function is provided with a water diversion hole corresponding to the waterway, and the switch of the outlet function of the first shower is realized by rotating the outlet.

4. A plug switch outlet mechanism according to claim 3, wherein the fixed unit further includes a sliding hole and a control cavity connected between the inlet waterway and the first and second waterways, in which the inner end of the sliding hole is connected to the control cavity;

the first switch mechanism is provided with a push plate and a sealing, the push plate is sliding and connected to the sliding hole, the sealing is disposed in the inner end of the push plate, the switch is pivot jointed to the socket, the switch withstands the outer end of the push plate;

the switch withstands the push plate and drives the push plate slide between a first position and a second position, the second waterway is sealed by the sealing and the inlet waterway is connected to the first waterway when the push plate is situated in the first position, the first waterway is sealed by the sealing and the inlet waterway is connected to the second waterway when the push plate is situated in the second position.

5. A plug switch outlet mechanism according to claim 4, wherein the socket is provided with a plug surface according to the second shower, the plug surface is concaved to form an accommodating groove, which is connected to the outer opening of the sliding hole, one end of the switch is pivot jointed to the accommodating groove, and the other end of the switch withstands the outer end of the push plate.

6. A plug switch outlet mechanism according to claim 4, wherein an elastic piece is disposed between the push plate and the fixed unit, the elastic piece produce elastic force, the direction of the elastic force is from the first position to the second position, the elastic force works on the push plate.

7. A plug switch outlet mechanism according to claim 3, wherein the first shower is a head shower, the second shower is a hand shower, and the hand shower is connected to the second waterway of the head shower through a flexible tube.

8. A plug switch outlet mechanism according to claim 1, wherein the first shower is a head shower, the second shower is a hand shower, and the hand shower is connected to the second waterway of the head shower through a flexible tube.

9. A plug switch outlet mechanism according to claim 2, wherein the fixed unit further includes a sliding hole and a control cavity connected between the inlet waterway and the first and second waterways, the inner end of the sliding hole is connected to the control cavity;

the first switch mechanism is provided with a push plate and a sealing, the push plate is sliding and connected to the sliding hole, the sealing is disposed in the inner end of the push plate, the switch is pivot jointed to the socket, the switch withstands the outer end of the push plate; the switch withstands the push plate and drives the push plate slide between a first position and a second position, the second waterway is sealed by the sealing and the inlet waterway is connected to the first waterway when the push plate is situated in the first position, the first waterway is sealed by the sealing and the inlet waterway is connected to the second waterway when the push plate is situated in the second position.

10. A plug switch outlet mechanism according to claim 9, wherein the socket is provided with a plug surface according to the second shower, the plug surface is concaved to form an accommodating groove, which is connected to the outer opening of the sliding hole, one end of the switch is pivot jointed to the accommodating groove, and the other end of the switch withstands the outer end of the push plate.

11. A plug switch outlet mechanism according to claim 9, wherein an elastic piece is disposed between the push plate and the fixed unit, the elastic piece produce elastic force, the direction of the elastic force is from the first position to the second position, and the elastic force works on the push plate.

12. A plug switch outlet mechanism according to claim 2, wherein the first shower is a head shower, the second shower is a hand shower, and the hand shower is connected to the second waterway of the head shower through a flexible tube.

13. A plug switch outlet mechanism according to claim 1, wherein the fixed unit further includes a sliding hole and a control cavity connected between the inlet waterway and the first and second waterways, the inner end of the sliding hole being connected to the control cavity;

the first switch mechanism is provided with a push plate and a sealing, the push plate is sliding and connected to the sliding hole, the sealing is disposed in the inner end of the push plate, the switch is pivot jointed to the socket, the switch withstanding the outer end of the push plate; and the switch withstands the push plate and drives the push plate to slide between a first position and a second position, the second waterway is sealed by the sealing and the inlet waterway is connected to the first waterway when the push plate is situated in the first position, the waterway is sealed by the sealing and the inlet waterway is connected to the second waterway when the push plate is situated in the second position.

14. A plug switch outlet mechanism according to claim 13, wherein the socket is provided with a plug surface mating with the second shower, the plug surface is concaved to form an accommodating groove, which is connected to the outer opening of the sliding hole, one end of the switch is pivot jointed to the accommodating groove, and the other end of the switch withstands the outer end of the push plate.

15. A plug switch outlet mechanism according to claim 13, wherein an elastic piece is disposed between the push plate and the fixed unit, the elastic piece produce elastic force, the direction of the elastic force is from the first position to the second position, and the elastic force works on the push plate.

16. A plug switch outlet mechanism according to claim 1, wherein the fixed unit includes a ball unit, a body, a main body, an upper water diversion body, a joint and a press plate:

the body is penetrated by a first through hole in the middle of the body and a second through hole;

the main body is provided with an inlet waterway formed from a top surface concaved downwards, a sliding groove formed from a side surface concaved inwards, a first watercourse, a second watercourse, a water groove formed from the side surface of the main body concaved inwards, and a connection waterway connected to the second watercourse and the water groove;

the upper water diversion body is penetrated by a water channel therethrough, the joint is passed through the second through hole, one end of the joint is connected to the water groove, while the other end is extended out of the body to connect to a hand shower through a flexible tube; and the press plate is fixed to the end of the sliding groove.

17. A plug switch outlet mechanism according to claim 16, wherein the top surface of the upper water diversion body and the bottom surface of the main body are welded together, and the water channel is connected to the first watercourse to form the first waterway.

18. A plug switch outlet mechanism according to claim 16, wherein the entries of the first watercourse and the second watercourse are disposed on the inner surface of the sliding groove.

* * * * *